No. 798,585. PATENTED AUG. 29, 1905.
C. R. HOWARD.
TRACK GAGE.
APPLICATION FILED MAR. 13, 1905.
2 SHEETS—SHEET 1.
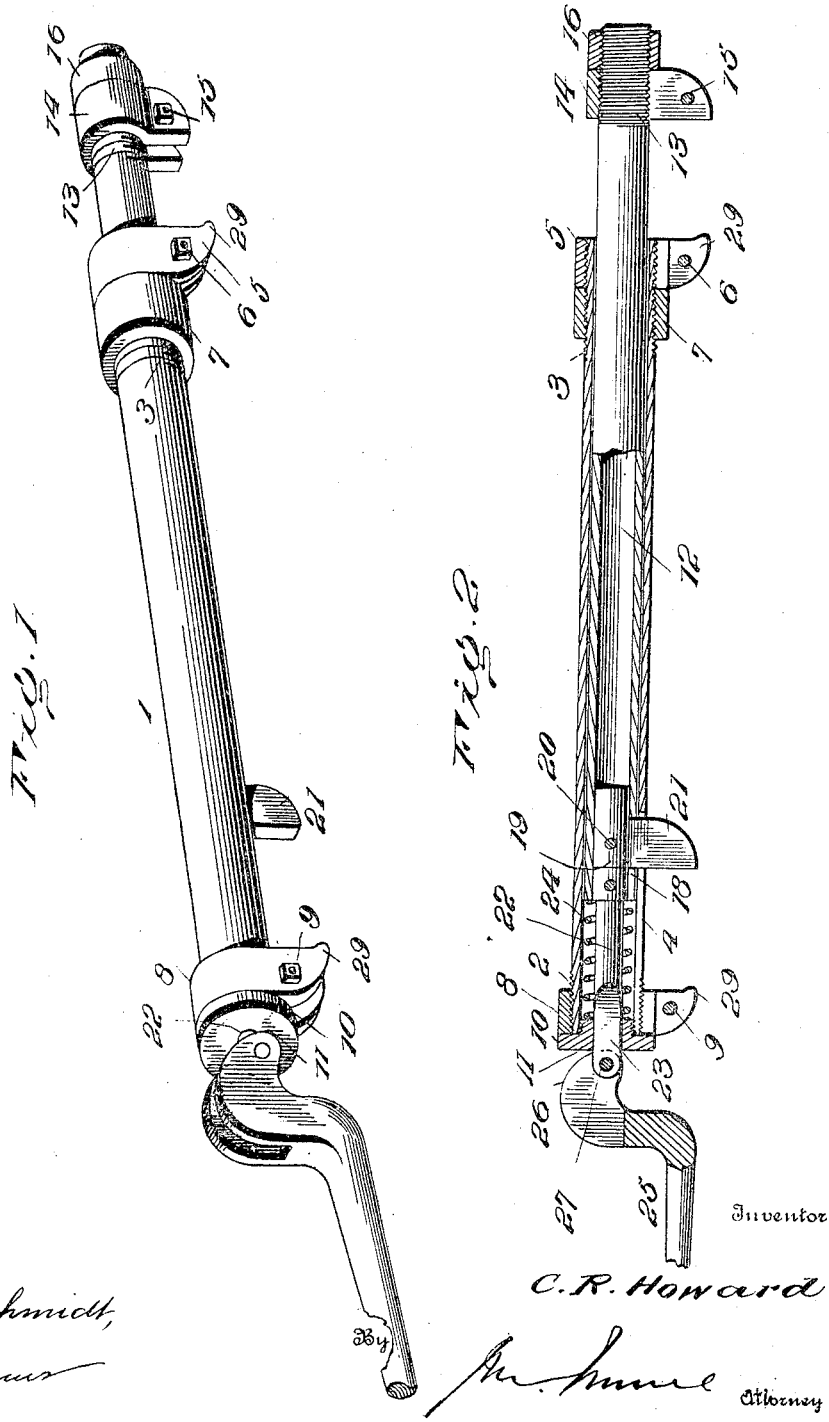

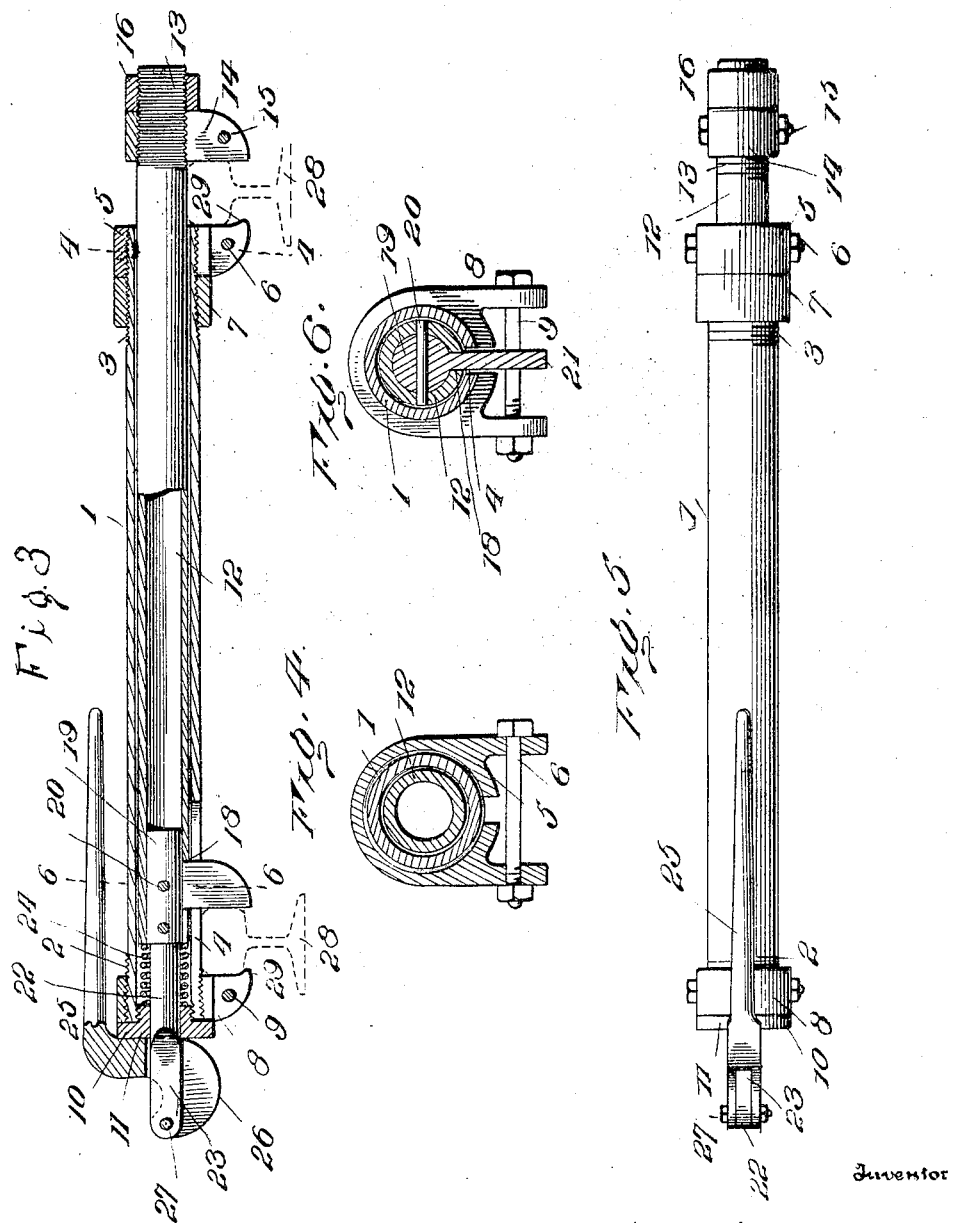

UNITED STATES PATENT OFFICE.

CYRUS R. HOWARD, OF JOHNSTOWN, PENNSYLVANIA.

TRACK-GAGE.

No. 798,585. Specification of Letters Patent. Patented Aug. 29, 1905.

Application filed March 13, 1905. Serial No. 249,900.

*To all whom it may concern:*

Be it known that I, CYRUS R. HOWARD, a citizen of the United States, residing at Johnstown, in the county of Cambria and State of Pennsylvania, have invented new and useful Improvements in Track-Gages, of which the following is a specification.

My invention relates to improvements in track-gages; and its object is to provide a light and convenient adjustable structure for quickly applying the gage to rails.

A further object of the invention is to provide a track-gage with adjustable spring-actuated jaws normally forced open to set the gage for the next operation.

Other objects and advantages will be hereinafter referred to, and particularly pointed out in the claims.

In the drawings, Figure 1 is a perspective view of my improved track-gage. Fig. 2 is a vertical section showing the gages in their normal position. Fig. 3 is a similar view showing the gages in operative position on the tracks. Fig. 4 is a transverse section on the line 4 4, Fig. 3. Fig. 5 is a plan view. Fig. 6 is a transverse section on the line 6 6, Fig. 3.

1 indicates a tubular bar threaded at both ends 2 and 3 and provided with a slot 4. Screwed on the threaded end 3 is a split gage 5, clamped by a bolt 6 and held against lateral movement by a jam-nut 7. The opposite end 2 has screwed on it a split gage 8, clamped by a bolt 9 and bearing against a flange 10 of a threaded plug 11, fitted into the tube 1. The distance between the gages 5 and 8 is what may be termed "fixed" or "standard" width between the inside of one track and outside of the opposite track.

A tubular bar 12 works freely within the bar 1, and one end extends beyond the end of the latter, where it is provided with screw-threads 13. Engaging the threaded end 13 is a split gage 14, clamped with a bolt 15 and held in place by a jam-nut 16. The gage 14 coöperates with the gage 5 to engage one of the tracks. The opposite end of the bar 12 is formed with a slot 18, and fitting within the end of said bar opposite the slot 18 is a plug 19, fastened in place by a bolt 20 and having a depending gage 21, the gage passing through the slots 18 and 4 and coöperating with gage 8. Also fitting in the end of bar 12 is a rod 22, formed with a flattened perforated extension 23, which passes through an opening in the plug 11. Between the plug 11 and the end of the bar 12 and encircling the rod 22 is a coiled spring 24, which normally forces the gages 21 and 14 away from the gages 8 and 5.

25 indicates an operating-lever having a cam 26, pivoted by a pin 27, passing through the perforated end of the rod 22, the operative face of the cam bearing on the outer face of the flange 10.

The operation of the invention is as follows: Assuming the parts to be in the position shown in Fig. 3, the gage is placed down on the tracks 28 and the lever 25 is thrown in the direction of the arrow, which draws the gage 21 toward the gage 8 and the gage 14 toward the gage 5. It should be stated at this point that the gages 8 and 5 are fixed, and in use the gage 8 is placed against the outer side of a track, while the other gage 5 bears against the inner side of the opposite track, as clearly shown in the drawings. When the gages 14 and 21 are drawn in toward their coöperating gages, the spring 24 is compressed, and by the construction and relative location of the pivot-pin 27 and the cam 26 the lever 25 becomes locked and holds the gages tight against the rails while the latter are being spiked in place, the gage being prevented from upward disengagement by lips 29 on the gages 8 and 5. To release the gage from the tracks, the lever is thrown toward the left, and the spring acting on the end of the tubular bar forces the latter. Consequently the gages 14 and 21 move away from their coacting gages, the open movement being limited by the gage 21 contacting with the wall of the slot 4.

My invention is extremely simple and durable and can be conveniently and rapidly manipulated to accomplish the desired result.

What I claim as new is—

1. A track-gage comprising a movable gage, a fixed gage, a spring interposed between the gages to normally separate the latter, and an operating-lever.

2. A track-gage comprising a movable bar bearing two gages adapted to bear against adjacent track-rails, a stationary bar having two gages disposed opposite the two movable gages, a spring to normally force the gages on the movable bar away from the gages of the stationary bar, and an operating-lever to move the gages together and lock the gage on the track.

3. A track-gage comprising a tubular stationary bar having gages, a bar mounted to slide within the tubular bar, gages carried by the sliding bar, one of said gages being outside the stationary bar and another of said gages passing through a slot formed in the stationary bar, and means for automatically operating the gages in one direction, and means for manually operating the gages in the opposite direction.

4. A track-gage comprising two bars, each bar carrying two gages, the gage of one bar being disposed to coöperate with the gages of the other bar, means automatically operating to effect a movement of the gages in one direction, and means for manually moving the gages in the opposite direction, and for locking the gage to the track.

5. A track-gage comprising a stationary bar, a movable bar, gages carried by the stationary bar, coöperating gages carried by the movable bar, a spring for spreading the gages, and a cam-lever connected to the movable bar for drawing the gages together, and locking the gage to the track.

6. A track-gage comprising a stationary bar, a movable bar, gages carried by the stationary bar, said gages having lips to engage under the flanges of track-rails, coöperating gages carried by the movable bar, a spring for spreading the gages, and a cam-lever connected to the movable bar for drawing the gages together, and locking the gage to the track.

7. A track-gage comprising two pairs of gages, each pair of gages adapted to coöperate on opposite sides of a rail, means for simultaneously moving the two pairs of gages to compel them to move a predetermined distance, and means to spread the gages independently of the means for simultaneously moving them.

In testimony whereof I affix my signature in presence of two subscribing witnesses.

CYRUS R. HOWARD.

Witnesses:
EDWARD FRANKE,
AUGUST W. FRANKE.